(12) United States Patent
Sugiyama (10) Patent No.: US 10,791,233 B2
(45) Date of Patent: Sep. 29, 2020

(54) IMAGE FORMING APPARATUS CAPABLE OF PERFORMING A PRINT JOB TO PRINT AN IMAGE ON A SHEET BEING CONVEYED

(71) Applicant: KYOCERA Document Solutions Inc., Osaka (JP)

(72) Inventor: Tsukasa Sugiyama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/730,502

(22) Filed: Dec. 30, 2019

(65) Prior Publication Data
US 2020/0244830 A1     Jul. 30, 2020

(30) Foreign Application Priority Data

Jan. 25, 2019   (JP) ................. 2019-010980

(51) Int. Cl.
*H04N 1/00* (2006.01)
*G06F 3/12* (2006.01)

(52) U.S. Cl.
CPC ....... *H04N 1/00657* (2013.01); *G06F 3/1215* (2013.01); *H04N 1/0057* (2013.01); *H04N 1/00408* (2013.01); *G06F 3/125* (2013.01); *G06F 3/1211* (2013.01)

(58) Field of Classification Search
None
See application file for complete search history.

(56) References Cited

U.S. PATENT DOCUMENTS

| 2006/0261535 | A1* | 11/2006 | Shiohara | B65H 3/0669 271/9.01 |
|---|---|---|---|---|
| 2007/0001366 | A1* | 1/2007 | Yano | B65H 3/44 271/9.01 |
| 2012/0027490 | A1* | 2/2012 | Hara | B41J 11/0025 400/582 |
| 2012/0262514 | A1* | 10/2012 | Hara | B41J 3/60 347/16 |

FOREIGN PATENT DOCUMENTS

JP    2011-123274 A    6/2011

\* cited by examiner

*Primary Examiner* — Miya J Williams
(74) *Attorney, Agent, or Firm* — Stein IP, LLC (57) ABSTRACT

An image forming apparatus includes a conveyance path, a plurality of setting portions, a printing portion, an operation panel, and a control portion. Before starting a mixed-sheet job, with respect to each of such setting portions of the plurality of setting portions as have a first sheet or a second sheet set therein, the control portion calculates first time, which is a period of time required for the first sheet to reach a registration position in a case where the first sheet is fed from the each of the such setting portions, sets a setting portion with respect to which the first time is shortest as a first setting portion, and makes the operation panel display recommendation information recommending setting the first sheet in the first setting portion.

5 Claims, 5 Drawing Sheets

IMAGE FORMING APPARATUS CAPABLE OF PERFORMING A PRINT JOB TO PRINT AN IMAGE ON A SHEET BEING CONVEYED

INCORPORATION BY REFERENCE

This application is based upon and claims the benefit of priority from the corresponding Japanese Patent Application No. 2019-010980 filed on Jan. 25, 2019, the entire contents of which are incorporated herein by reference.

BACKGROUND

The present disclosure relates to an image forming apparatus capable of performing a print job to print an image on a sheet being conveyed.

Conventional image forming apparatuses include a setting portion in which sheets are set to be used in a print job. Conventional image forming apparatuses convey a sheet that is fed out of the setting portion, and print an image on the sheet at the time point when the sheet being conveyed passes through a printing position.

Conventional image forming apparatuses are capable of printing an image on various types of sheets having different basis weights, such as thick and regular paper. Here, the conventional image forming apparatuses change the conveyance speed of a sheet used in a print job in accordance with the basic weight of the sheet. Specifically, the conventional image forming apparatuses reduce the conveyance speed as the basic weight of the sheet is greater.

SUMMARY

According to one aspect of the present disclosure, an image forming apparatus includes a conveyance path, a plurality of setting portions, a printing portion, an operation panel, and a control portion. The conveyance path passes through a registration position and a printing position. In the plurality of setting portions, a sheet is set. The printing portion feeds the sheet from any of the plurality of setting portions to convey the sheet toward the registration position, once suspends conveyance of the sheet when the sheet reaches the registration position, and executes a print job to print an image on the sheet when the sheet passes through the printing position. The operation panel displays information and accepts an operation. The control portion controls the printing portion and the operation panel. In conveying the sheet, the printing portion reduces a conveyance speed of the sheet as a basic weight of the sheet conveyed is greater. In a case where the print job to be executed by the printing portion is a mixed-sheet job to be performed on a first sheet and a second sheet having a smaller basic weight than the first sheet, before starting the mixed-sheet job, with respect to each of such setting portions of the plurality of setting portions as have the first sheet or the second sheet set therein, the control portion calculates first time, which is a period of time required for the first sheet to reach the registration position in a case where the first sheet is fed from the each of the such setting portions, sets, as a first setting portion, a setting portion with respect to which the first time is a shortest first time, and makes the control panel display recommendation information recommending setting the first sheet in the setting portion set as the first setting portion.

DETAILED DESCRIPTION

<Configuration of Image Forming Apparatus>

Figure 1:
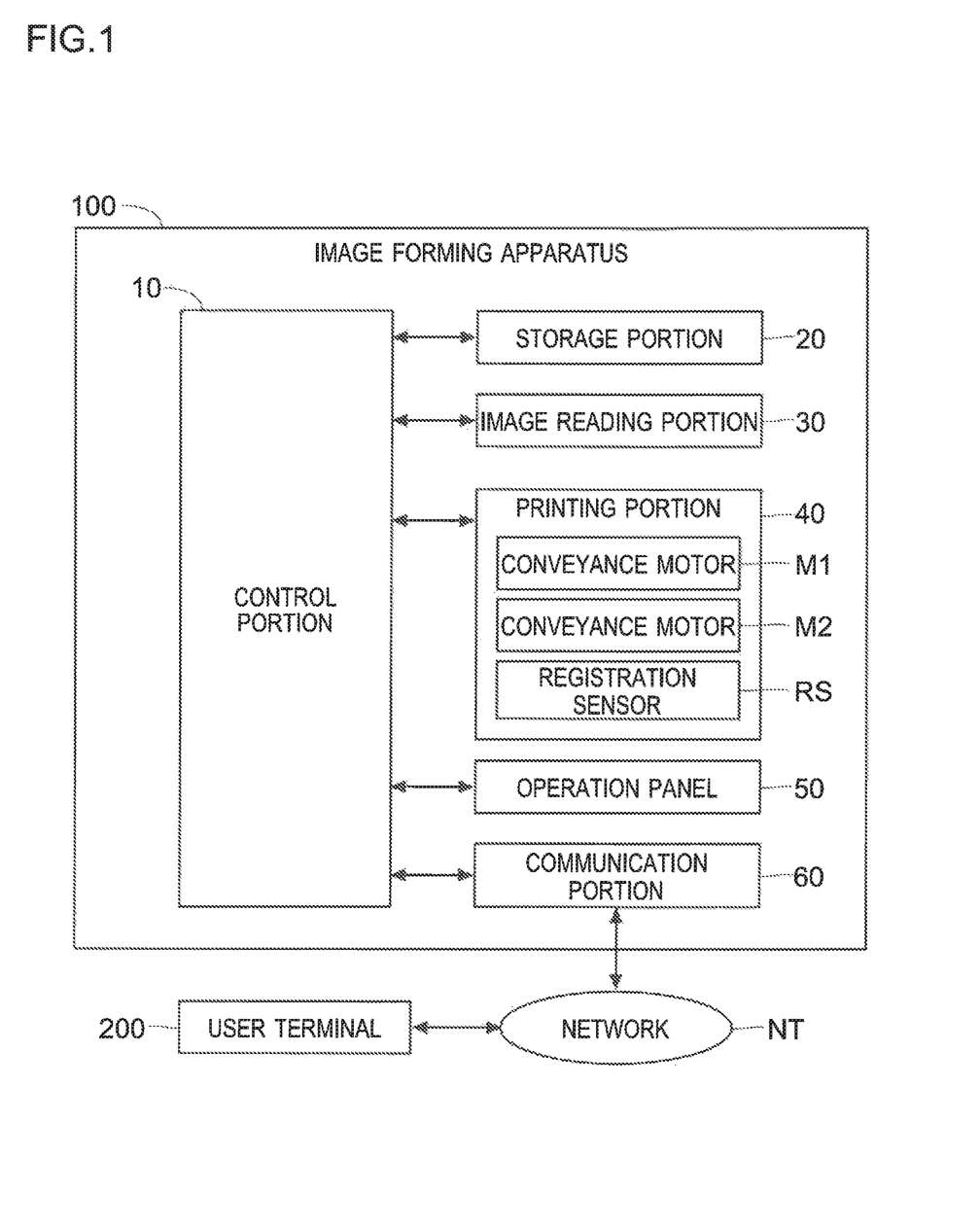
FIG. 1 is a block diagram showing a configuration of an image forming apparatus according to an embodiment of the present disclosure.

As shown in FIG. 1, an image forming apparatus 100 of the present embodiment includes a control portion 10 and a storage portion 20. The control portion 10 includes a CPU. The control portion 10 controls each portion of the image forming apparatus 100 based on a control program and control data. The storage portion 20 includes a ROM and a RAM. The storage portion 20 stores control programs and control data therein. The storage portion 20 is connected with the control portion 10. The control portion 10 reads and writes information from and to the storage portion 20.

The image forming apparatus 100 further includes an image reading portion 30 and a printing portion 40. The control portion 10 controls a reading operation performed by the image reading portion 30, and also controls a printing operation performed by the printing portion 40.

The image reading portion 30 optically reads a document (not shown). The image reading portion 30 includes a light source and an image sensor. A document as a reading target is set on a contact glass (not shown). The light source irradiates the document with light. The image sensor receives reflected light reflected on the document and performs photoelectric conversion on the reflected light. The image reading portion 30 reads the document and produces image data of the document.

Figure 2:
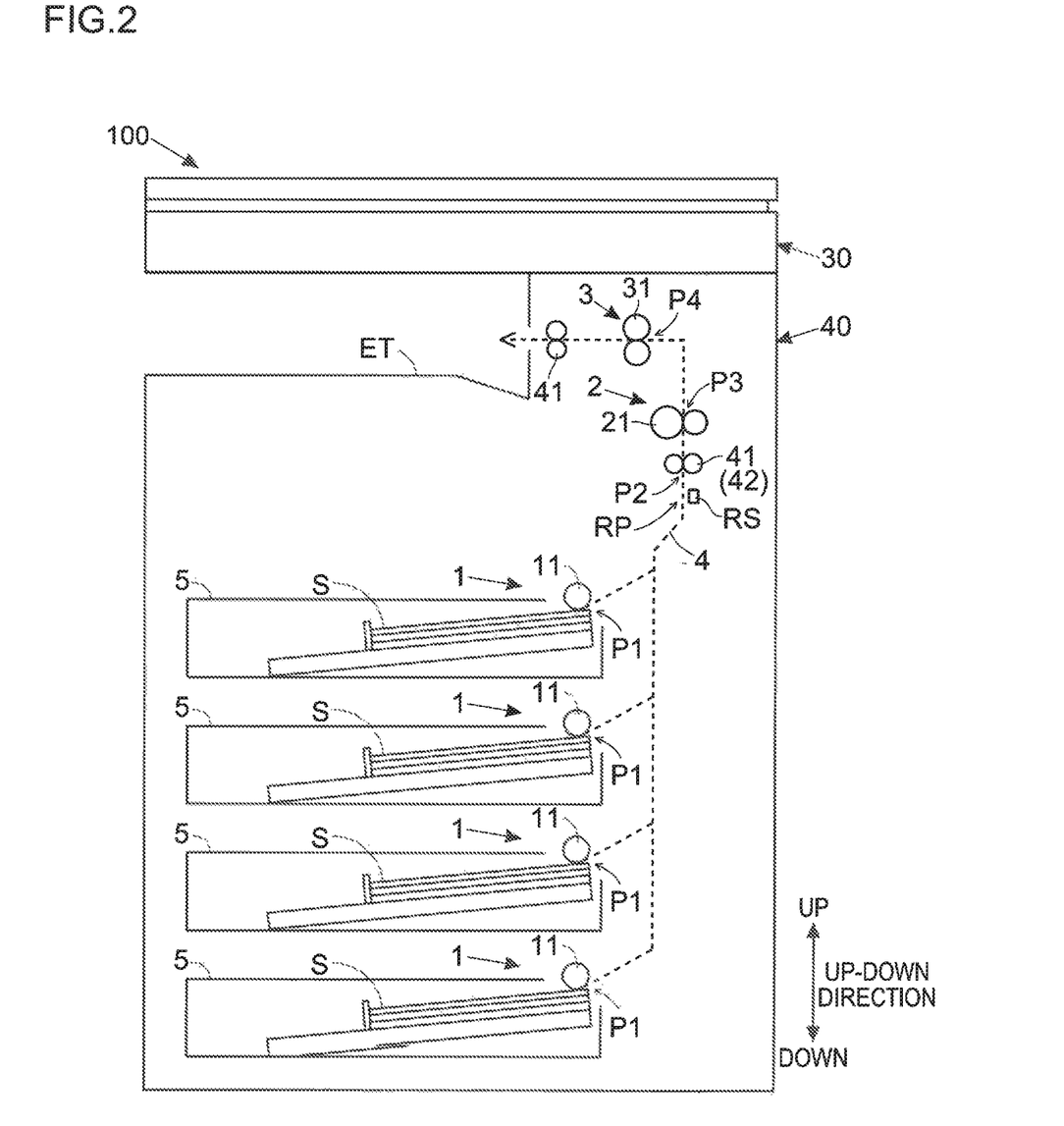
FIG. 2 is a diagram schematically showing a configuration of the image forming apparatus according to the embodiment of the present disclosure.

The printing portion 40 includes, as shown in FIG. 2, a sheet feed portion 1, a transfer portion 2, and a fixing portion 3. The printing portion 40 performs a print job. A sheet S used in the print job is, for example, a paper sheet (including a regular paper sheet and a thick paper sheet having a greater basic weight than the regular paper sheet). In the print job, the printing portion 40 conveys the sheet S along a conveyance path 4 (indicated by a broken-line arrow in FIG. 2), and prints an image on the sheet S being conveyed.

The conveyance path 4 extends from a sheet feeding position P1, passes through a registration position P2, a printing position P3, and a fixing position P4 in this order, and reaches a sheet ejection tray ET. The sheet S used in the print job is conveyed from the sheet feeding position P1 in the conveyance path 4 toward the sheet ejection tray ET.

The sheet feed portion 1 is disposed at the sheet feeding position P1. The sheet feed portion 1 feeds the sheet S from the sheet feeding position P1 into the conveyance path 4. The sheet S used in the print job is set (stored) in a cassette 5. The cassette 5 corresponds to "a setting portion". The cassette 5 is attachable and detachable to and from the image forming apparatus 100. For example, to perform a sheet replacement operation to replace sheets S currently set in the cassette 5 with sheets S of another type, a user detaches and attaches the cassette 5 with respect to the image forming apparatus 100.

The sheet feed portion 1 includes a sheet feed roller 11. The sheet feed roller 11 contacts a sheet S set in the cassette 5. The sheet feed roller 11 rotates in contact with the sheet S. Thereby, the sheet S set in the cassette 5 is fed from the sheet feeding position P1 into the conveyance path 4.

The conveyance path 4 is provided with a conveyance roller pair 41. A plurality of conveyance roller pairs 41 are provided. The plurality of conveyance roller pairs 41 each form a conveyance nip for nipping the sheet S. The plurality of conveyance roller pairs 41 each rotate to convey, along the conveyance path 4, the sheet S having been fed into the conveyance path 4. The sheet S conveyed along the conveyance path 4 passes through the sheet feeding position P1, the registration position P2, the printing position P3, and the fixing position P4 in this order, to be finally ejected onto the sheet ejection tray ET.

One of the plurality of conveyance roller pairs 41 functions as a registration roller pair 42. The registration roller pair 42 is disposed at the registration position P2. The position of the conveyance nip (a registration nip) formed by the registration roller pair 42 is the registration position P2.

The registration roller pair 42 stops rotating by the time when the sheet S reaches the registration position P2. That is, when the sheet S reaches the registration position P2, the conveyance of the sheet S having reached the registration position P2 is suspended. At this time, a conveyance roller pair 41 (not shown in FIG. 2) disposed at a position on an upstream side of the registration position P2 in a sheet conveyance direction still continues rotating. As a result, a warp is formed in the leading edge portion of the sheet S having reached the registration position P2. By thus suspending the conveyance of the sheet at the registration position P2, it is possible to correct skew of the sheet S. Then, the registration roller pair 42 starts to rotate on the lapse of a predetermined period of time after the sheet S reaching the registration position P2 (after the warp is formed in the leading edge portion of the sheet S), and thereby conveys the sheet S from the registration position P2 toward the printing position P3.

The transfer portion 2 includes a transfer roller pair 21. The transfer roller pair 21 is composed of a photosensitive drum and a transfer roller. Although unillustrated, the transfer portion 2 includes a charging device, an exposure device, and a developing device.

The photosensitive drum carries a toner image on a circumferential surface thereof. The transfer roller is pressed against the photosensitive drum such that a transfer nip is formed between the photosensitive drum and the transfer roller. The position of the transfer nip is the printing position P3. The charging device charges the circumferential surface of the photosensitive drum. The exposure device forms an electrostatic latent image on the circumferential surface of the photosensitive drum. The developing device develops the electrostatic latent image formed on the circumferential surface of the photosensitive drum into a toner image. The transfer portion 2, while conveying the sheet S having proceeded to the printing position P3, transfers the toner image formed on the circumferential surface of the photosensitive drum onto the sheet S. That is, at the time point when the sheet S conveyed along the conveyance path 4 passes through the printing position P3, an image is printed on the sheet S.

The fixing portion 3 includes a fixing roller pair 31. The fixing roller pair 31 is composed of a fixing roller and a pressure roller. The fixing roller includes a heater (not shown) disposed inside thereof. The pressure roller is pressed against the fixing roller such that a fixing nip is formed between the fixing roller and the pressure roller. The position of the fixing nip is the fixing position P4.

The fixing portion 3, while conveying the sheet S having proceeded to the fixing position P4, applies heat and pressure to the sheet S. Thereby, the toner image is fixed on the sheet S. After the fixing, the sheet S is ejected onto the sheet ejection tray ET.

Here, the image forming apparatus 100 has a plurality of cassettes 5 attached thereto. The sheet feed portion 1 is provided one at each of the plurality of cassettes 5. When attached to the image forming apparatus 100, the plurality of cassettes 5 are located one over another in the up-down direction of the image forming apparatus 100. Accordingly, the sheet S is conveyed to the registration position P2 over different conveyance distances from the different cassettes 5. The higher a cassette 5 is located, the shorter the conveyance distance of the sheet S is from the cassette 5 to the registration position P2.

Referring back to FIG. 1, the image forming apparatus 100 is provided with a conveyance motor M1. The conveyance motor M1 is a motor for rotating the sheet feed roller 11, the conveyance roller pair 41 that is disposed on an upstream side of the registration position P2 in the sheet conveyance direction, and the registration roller pair 42. For example, the sheet feed roller 11 receives a driving force from the conveyance motor M1 via an unillustrated sheet feed clutch. The registration roller pair 42 receives a driving force from the conveyance motor M1 via an unillustrated registration clutch.

The control portion 10 controls the conveyance motor M1. The control portion 10 controls the sheet feed clutch to thereby make the sheet feed roller 11 rotate or stop rotating. The control portion 10 controls the registration clutch to thereby make the registration roller pair 42 rotate or stop rotating. Here, there is no particular restriction on the number of conveyance motors M1 to be provided. The conveyance motors M1 may be provided one with respect to each of the plurality of sheet feed portions 1. A conveyance motor M1 with respect to the registration roller pair 42 may be separately provided.

The image forming apparatus 100 further includes a conveyance motor M2. The conveyance motor M2 is a motor for rotating the transfer roller pair 21, the fixing roller pair 31, and the conveyance roller pair 41 that is disposed on a downstream side of the registration position P2 in the sheet conveyance direction.

The control portion 10 controls the conveyance motor M2. Here, there is no particular restriction on the number of conveyance motors M2 to be provided. A conveyance motor M2 for the transfer roller pair 21 may be separately provided. A conveyance motor M2 for the fixing roller pair 31 may be separately provided.

The image forming apparatus 100 further includes a registration sensor RS. The registration sensor RS outputs different values corresponding to whether the sheet S is present or absent at a predetermined position RP (hereinafter referred to as the registration detection position RP) between the sheet feeding position P1 and the registration position P2 in the conveyance path 4.

For example, the registration sensor RS is a transmissive optical sensor having a light emitting portion and a light receiving portion. The detection target of the registration sensor RS is an actuator (not shown). The actuator is supported rotatably and so as to project to inside the conveyance path 4. When the leading edge of the sheet S reaches the registration detection position RP, the actuator is pushed by the sheet S and rotates toward one side to block (or open) the optical path between the light emitting portion and the light receiving portion. On the other hand, when the rear edge of the sheet S passes through the registration detection position RP, the actuator rotates toward a side opposite to the one side and returns to its original position to open (or block) the optical path between the light emitting portion and the light receiving portion. Thereby, the output value of the registration sensor RS changes corresponding to the presence and absence of the sheet S at the registration detection position RP.

The registration sensor RS is connected with the control portion 10. The control portion 10 monitors the output value of the registration sensor RS during a print job. The control portion 10 detects, based on the output value of the registration sensor RS, presence or absence of the sheet S at the registration detection position RP. The control portion 10 also detects, based on the output value of the registration sensor RS, the leading edge of the sheet S reaching the registration position P2 and the rear edge of the sheet S passing through the registration position P2.

The image forming apparatus 100 further includes an operation panel 50. The operation panel 50 includes a touch screen and a hardware button. The touch screen displays a screen on which software buttons are arranged, and accepts an operation performed by the user. As the hardware button, a plurality of buttons are provided on the operation panel 5, including a start button for accepting, from the user, a request to execute a print job.

The operation panel 50 is connected with the control portion 10. The control portion 10 controls a display operation performed by the operation panel 50, and also detects an operation performed with respect to the operation panel 50. To make the image forming apparatus 100 perform a print job (a copy job) that includes document reading, the user sets a document on the contact glass and operates the start button on the operation panel 50.

On detecting an operation performed with respect to the start button on the operation panel 50 with a document set on the contact glass, the control portion 10 judges that a request from the user to execute a print job has been accepted. In this case, the control portion 10 makes the image reading portion 30 read the document. Then, the control portion 10 produces printing image data based on the read data obtained by the document reading performed by the image reading portion 30, and makes the printing portion 40 perform printing of an image on the sheet S based on the printing image data.

For a print job that includes document reading, a job setting for the print job is accepted via the operation panel 50. The job setting includes specifying the number of copies to be printed, and the type (basic weight) of sheets S to be used in the print job. The control portion 10 controls the printing portion 40 based on setting details having been set in the job setting.

The image forming apparatus 100 further includes a communication portion 60. The communication portion 60 is an interface for connecting the image forming apparatus 100 with a network NT such as a LAN. The communication portion 60 includes a communication circuit, a communication memory, a communication connector, etc.

The communication portion 60 is connected with the control portion 10. The control portion 10 uses the communication portion 60 to communicate with a user terminal 200 connected with the network NT. The user terminal 200 is used by the user of the image forming apparatus 100. The user terminal 200 is, for example, a personal computer. The user terminal 200 has a printer driver installed therein to use the image forming apparatus 100 as a printer.

When the image forming apparatus 100 is used as a printer, job data including printing data (such as PDL data) is transmitted from the user terminal 200 to the image forming apparatus 100. When the communication portion 60 receives the job data, the control portion 10 judges that a request, from the user, to execute a print job has been accepted. When the communication portion 60 receives the job data, the control portion 10 produces printing image data based on the received job data, and makes the printing portion 40 perform printing of an image with respect to a sheet S based on the printing image data.

For the print job based on the print data received from the user terminal 200, the accepting of a job setting for the print job is performed by the user terminal 200. The user terminal 200 includes, in the job data, setting information indicating the job setting. The control portion 10 controls the printing portion 40 based on setting details indicated in the setting information.

<Outline of Print Job>

On accepting the request for executing a print job, the control portion 10 recognizes the job setting having been set by the user. Specifically, the control portion 10 recognizes the type (the basic weight) of the sheet S specified by the user. The control portion 10 also recognizes, based on cassette information, in which of the cassettes 5 the sheet S specified by the user is set. The cassette information indicates the type of sheets S set in each of the plurality of cassettes 5. The cassette information is stored in the storage portion 20.

The control portion 10 sets the conveyance speed of the sheet S to be used in the print job based on the type of the sheet S specified by the user (the type of the sheet S to be used in the print job). Conveyance speed information, which indicates the correspondence between types and conveyance speeds of sheets S, is stored in the storage portion 20. In the conveyance speed information, the correspondence between types and conveyance speeds of sheets S is defined such that the conveyance speed of a sheet S is reduced as the basic weight of the sheet S is greater. That is, the conveyance speed corresponding to a thick paper sheet is lower than the conveyance speed corresponding to a regular paper sheet.

The control portion 10 also performs sheet source setting processing to set a cassette 5 as a sheet source. The control portion 10 selects, from among such cassettes 5 of the plurality of cassettes 5 as have sheets S of the type specified by the user set therein, a cassette 5 with respect to which conveyance distance of a sheet S (hereinafter also referred to as "cassette-registration distance") is the shortest, and sets the cassette 5 as the sheet source.

Here, of the plurality of cassettes 5, the cassette 5 from which the cassette-registration distance is the shortest is the uppermost cassette 5. The cassette 5 from which the cassette-registration distance is the longest cassette-registration distance is the lowermost cassette 5 of the plurality of cassettes 5. The higher a cassette 5 is disposed, the shorter the cassette-registration distance from the cassette 5 is, and the lower a cassette 5 is disposed, the longer the cassette-registration distance from the cassette 5 is. Accordingly, in a case where sheets S of the type specified by the user are set in the uppermost cassette 5, the uppermost cassette 5 is set as the sheet source with priority. In a case where the uppermost cassette 5 does not have sheets S of the type specified by the user set therein and the second uppermost cassette 5 has sheets S of the type specified by the user set therein, the second uppermost cassette 5 is set as the sheet source with priority.

After setting the sheet source, the control portion 10 makes the printing portion 40 start the print job. At this time, the printing portion 40 feeds a sheet S from the cassette 5 set as the sheet source into the conveyance path 4 to convey the fed sheet S along the conveyance path 4. That is, the sheet S of the type specified by the user is conveyed along the conveyance path 4. The printing portion 40 conveys the sheet S at a conveyance speed corresponding to the type specified by the user. The printing portion 40 reduces the conveyance speed as the basic weight of a sheet S is greater. In a case where the type specified by the user is thick paper, the conveyance speed of the sheet S is lower than in a case where the type specified by the user is regular paper.

After making the printing portion 40 start the print job, the control portion 10, based on the output value of the registration sensor RS, makes a judgment on whether or not the rear edge of the sheet S has passed through the registration position P2. On judging that the rear edge of the sheet S has passed through the registration position P2, the control portion 10 makes the printing portion 40 feed a next sheet S. For example, the control portion 10 turns off the sheet feed clutch before the rear edge of the preceding sheet S passes through the sheet feeding position P1 (the position at which the sheet feed roller 11 is disposed) to bring the sheet feed roller 11 into a free state. Then, after the rear edge of the preceding sheet S has passed through the registration position P2, the control portion 10 turns on the sheet feed clutch and makes the sheet feed roller 11 rotate by means of the driving force of the conveyance motor M1.

<Print Job in Cover Mode>

As a mode of the print job, a cover mode is prepared. In a print job performed in the cover mode, a plurality of types of sheets S with different basic weights are used. In the following description, a print job performed in the cover mode will be referred to as "mixed-sheet job".

For example, in a mixed-sheet job, a thick paper sheet (corresponding to "a first sheet") and a regular paper sheet (corresponding to "a second sheet"), of which the basic weight is less than that of the thick paper sheet, are used. On the thick paper sheet, a cover image is printed, and on the regular paper sheet, another image is printed. Here, there is no particular restriction on the types of sheets S to be used in the mixed-sheet job. For example, a thin paper sheet of which the basic weight is smaller than that of the regular paper sheet may be used in the mixed-sheet job. In this case, the regular paper sheet corresponds to "the first sheet" and the thin paper sheet corresponds to "the second sheet"). The following description will deal with a case where thick paper sheets and regular paper sheets are used in a mixed-sheet job.

To make the image forming apparatus 100 execute a mixed-sheet job, it is necessary to previously set, in cassettes 5, sheets S of types (thick paper sheets and regular paper sheets) to be used in the mixed-sheet job. Generally, the usage frequency of regular paper sheets is high, but that of thick paper sheets is a low. Thus, it is likely that regular paper sheets are set in all of the plurality of cassettes 5. In this case, the regular paper sheets set in any of the cassettes 5 are replaced with thick paper sheets. In a case where the replacement of the sheets S has been performed with respect to a cassette 5, it is necessary to input update information into the image forming apparatus 100 to update the cassette information.

The acceptance of the input of the update information is performed by the operation panel 50. The operation panel 50 accepts a type inputting operation (a first operation and a second operation) performed by the user with respect to each of the cassettes 5. In the type inputting operation, the user inputs the type (basic weight) of the sheet S set in each of the cassettes 5. For example, the operation panel 50 accepts, as the first operation, an operation to select any of the plurality of cassettes 5. The operation panel 50 accepts, as the second operation, an operation to select any of the types of sheets S usable in the mixed-sheet job.

In the first operation, a cassette 5 in which sheets S have been replaced is selected. In the second operation, the type of the sheets S newly set in the selected cassette 5 is selected. Information indicating the cassette 5 having been selected in the first operation and information indicating the type of the sheets S having been selected in the second operation are inputted into the image forming apparatus 100 as update information.

When the operation panel 50 has accepted the type inputting operation, the control portion 10 updates the cassette information based on the update information having been inputted into the image forming apparatus 100. At this time, the control portion 10 recognizes, as the target to be updated in the cassette information, the information corresponding to the cassette 5 having been selected in the first operation. Then, the control portion 10 updates the type of the sheet S indicated in the update-target information to the type having been selected in the second operation.

On accepting a request to execute a mixed-sheet job, the control portion 10 recognizes such cassettes 5 as have sheets S of types to be used in the mixed-sheet job set therein. Specifically, the control portion 10 recognizes such cassettes 5 as have thick paper sheets set therein and such cassettes 5 as have regular paper sheets set therein.

Then, the control portion 10 performs the sheet source setting processing. In this processing, the control portion 10 selects, from among the such cassettes 5 as have thick paper sheets set therein, a cassette 5 from which the cassette-registration distance is shorter than from any other cassette 5 of the such cassettes 5, and sets the cassette 5 as the thick paper sheet source (a cassette 5 attached at a higher position is set as the sheet source with priority). The control portion 10 also selects, from among the such cassettes 5 as have regular paper sheets set therein, a cassette 5 from which the cassette-registration distance is shorter than from any other cassette 5 of the such cassettes 5, and sets the cassette 5 as the regular paper sheet source (a cassette 5 attached at a higher position is set as the sheet source with priority).

Then, the control portion 10 makes the printing portion 40 start the mixed-sheet job. To print an image on a thick paper sheet, the printing portion 40 feeds the thick paper sheet from the cassette 5 having been set as the thick paper sheet source into the conveyance path 4. To print an image on a regular paper sheet, the printing portion 40 feeds the regular paper sheet from the cassette 5 having been set as the regular paper sheet source into the conveyance path 4.

Here, with reference to FIGS. 3 and 4, a description will be given of time (required arrival time) required for a sheet S having been fed from the cassette 5 into the conveyance path 4 to reach the registration position P2. In the following description, the uppermost cassette 5 is denoted by the reference sign "5A", the second uppermost cassette 5 is denoted by the reference sign "5B", the third uppermost cassette 5 is denoted by the reference sign "5C", and the lowermost cassette 5 (the fourth cassette 5 from the top) is denoted by the reference sign "5D". Of sheets S of the plurality of types, a thick paper sheet is denoted by the reference sign "S1" and a regular paper sheet is denoted by the reference sign "S2".

Figure 3:
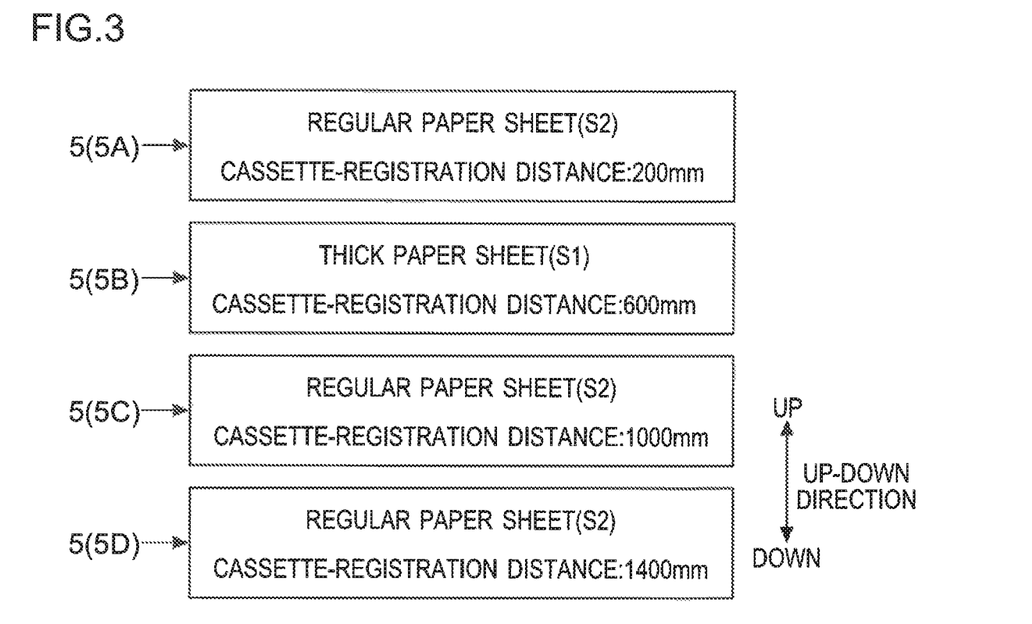
FIG. 3 is a diagram showing types of sheets set in cassettes in the image forming apparatus according to the embodiment of the present disclosure.

In the example shown in FIG. 3, thick paper sheets S1 are set in the cassette 5B, and regular paper sheets S2 are set in the cassette 5A. It is assumed that regular paper sheets S2 are set in each of the cassettes 5C and 5D.

In this example, it is only the cassette 5B that has thick paper sheets S1 set therein. Accordingly, in the printing of an image on thick paper sheets S1, the thick paper sheets S1 set in the cassette 5B are used. Of all the cassettes 5A, 5C, and 5D, of which all have regular paper sheets S2 set therein, the cassette-registration distance with respect to the cassette 5A is the shortest. Accordingly, in the printing of an image on regular paper sheets S2, the regular paper sheets S2 set in the cassette 5A are used.

Figure 4:
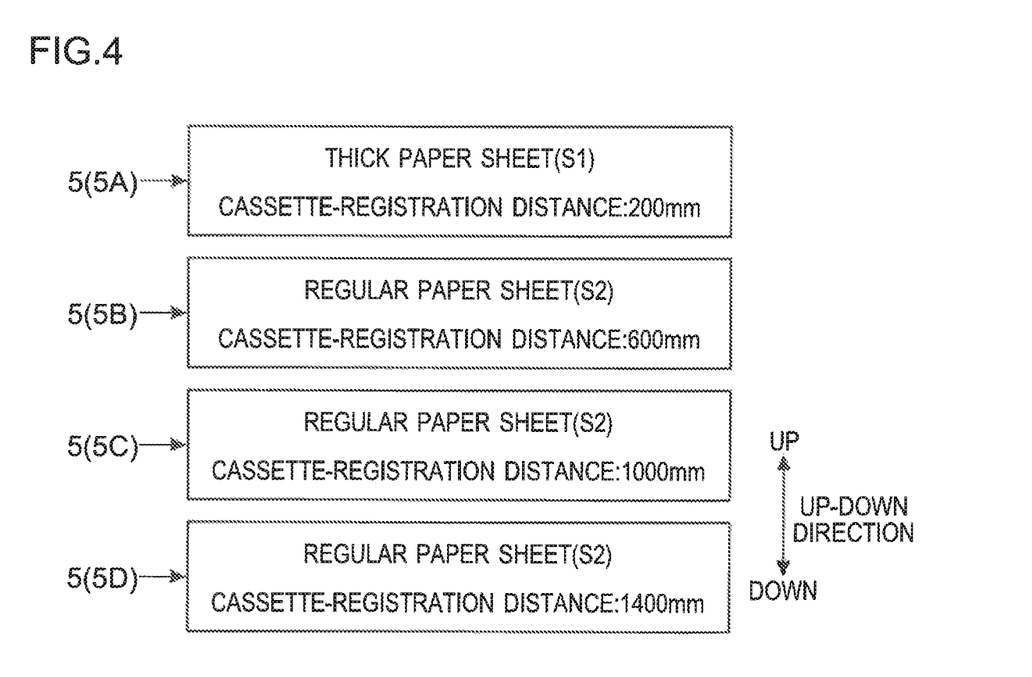
FIG. 4 is a diagram showing types of sheets set in the cassettes in the image forming apparatus according to the embodiment of the present disclosure.

In the example shown in FIG. 4, thick paper sheets S1 are set in the cassette 5A, and regular paper sheets 32 are set in the cassette 5B. In the cassettes 5C and 5D, regular paper sheets S2 are set.

In this example, it is only in the cassette 5A that thick paper sheets S1 are set. Accordingly, in the printing of an image on thick paper sheets S1, the thick paper sheets S1 set in the cassette 5A are used. Of all the cassettes 5B, 5C, and 5D, of which all have regular paper sheets S2 set therein, the cassette-registration distance with respect to the cassette 5B is the shortest. Accordingly, in the printing of an image on regular paper sheets S2, the regular paper sheets S2 set in the cassette 5B are used.

Here, it is assumed that the cassette-registration distance is 200 mm with respect to the cassette 5A, 600 mm with respect to the cassette 5B, 1000 mm with respect to the cassette 5C, and 1400 mm with respect to the cassette 5D. It is also assumed that the conveyance speed is set to 100 mm/sec for thick paper sheets S1, and to 200 mm/sec for regular sheets S2.

In this case, the required arrival time is 6 sec (=600/100) for a thick paper sheet S1 used in the mixed-sheet job performed in a first state shown in FIG. 3 (a job in which the thick paper sheets S1 in the cassette 5B and the regular paper sheets S2 in the cassette 5A are used). The required arrival time for a regular paper sheet S2 is 1 sec (=200/200). The total of required arrival time for the thick and regular paper sheets S1 and S2 is 7 sec.

On the other hand, in the mixed-sheet job in a second state shown in FIG. 4 (a job in which the thick paper sheets S1 in the cassette 5A and the regular paper sheets S2 in the cassette 5B are used), the required arrival time is 2 sec (=200/100) for a thick paper sheet S1. The required arrival time for a regular paper sheet S2 is 3 sec (=600/200). The total of the required arrival time for the thick and regular paper sheets S1 and S2 is 5 sec.

Comparing the mixed-sheet jobs performed in the first and second states with each other, in the first state, the required arrival time is 6 sec for a thick paper sheet S1, which is longer than that (2 sec) in the second state. That is, when the sheet S to be used is switched from a regular paper sheet S2 to a thick paper sheet S1 during the execution of a mixed-sheet job, it takes longer for a thick paper sheet S1 to reach the registration position P2 in the first state than in the second state (specifically, it takes only 2 sec in the second state, but it takes as long as 6 sec in the first state). In a case where a large number of copies are to be printed in the mixed-sheet job (that is, in a case of many times of switching between regular paper sheets S2 and thick paper sheets S1), the productivity of the mixed-sheet job is significantly lowered.

Figure 5:
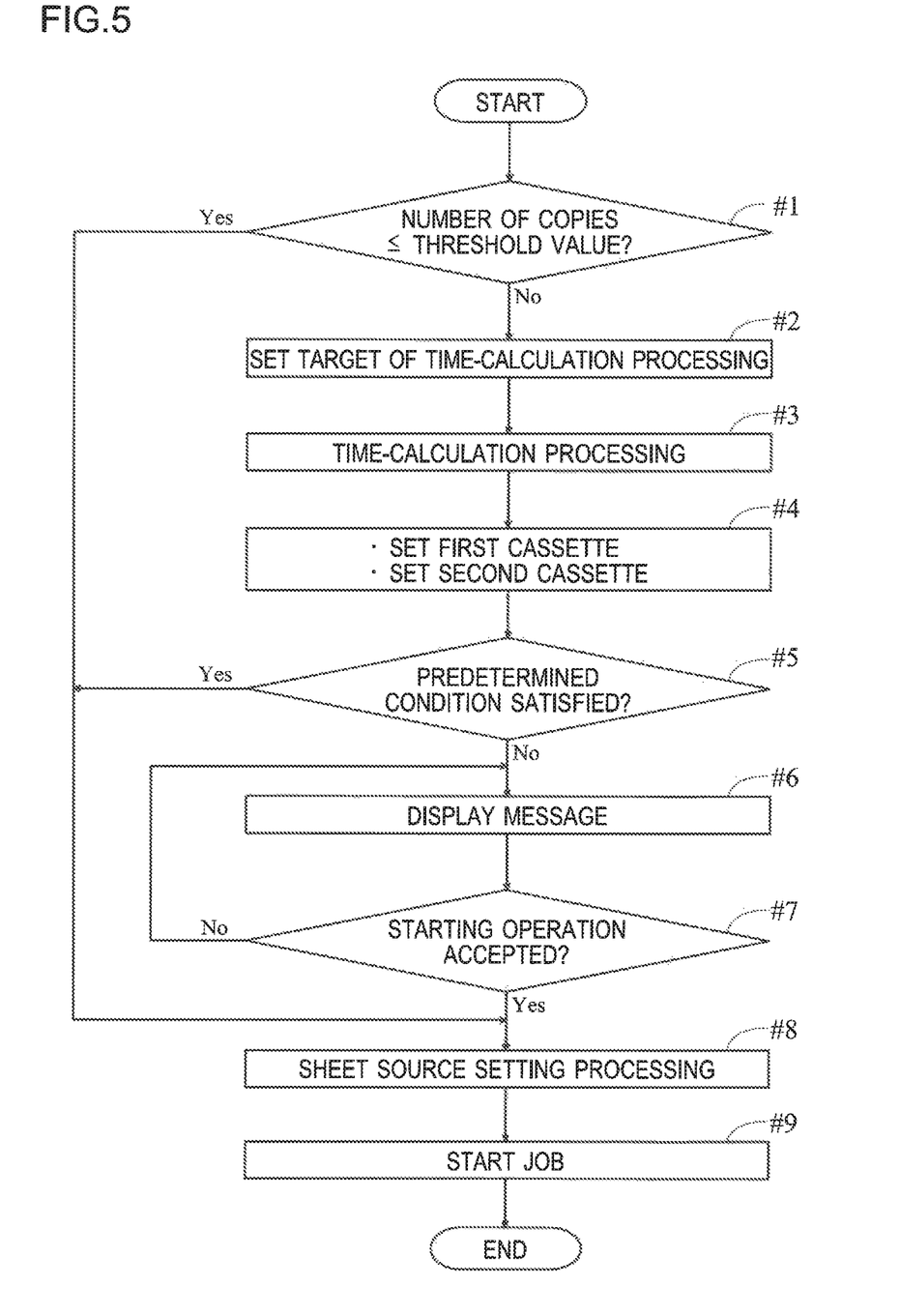
FIG. 5 is a flowchart showing a flow of a process performed by a control portion of the image forming apparatus according to the embodiment of the present disclosure.

To cope with this, in the present embodiment, before a mixed-sheet job is executed, the control portion 10 performs processing according to the flowchart shown in FIG. 5. The flowchart shown in FIG. 5 starts when the control portion 10 has judged that a request to execute a mixed-sheet job has been accepted.

In step #1, the control portion 10 judges whether or not the number of copies to be printed in the mixed-sheet job is equal to or less than a predetermined threshold value. If, as a result, the control portion 10 has judged that the number of copies to be printed in the mixed-sheet job exceeds the threshold value, the flow proceeds to step #2. Note that, the number of copies to be printed in the mixed-sheet job exceeding the threshold value means that switching between regular paper sheets S2 and thick paper sheets S1 will need to be performed a large number of times.

In step #2, the control portion 10 recognizes such cassettes 5 of the plurality of cassettes 5 as have either thick paper sheets S1 or regular paper sheets S2 set therein, and sets all the recognized cassettes 5 as the targets of time-calculation processing. In the example shown in FIG. 3, the cassettes 5A to 5D are all set as the targets. In a case where the cassette 5D has set therein sheets S of a type that is not to be used in the mixed-sheet job, or in a case where the cassette 5D hast no sheet S set therein, the cassettes 5A to 5C are set as the targets.

In step #3, the control portion 10 performs the time-calculation processing to calculate, based on the conveyance distance and the conveyance speed of a sheet S from a cassette 5 (the sheet feeding position P1) to the registration position P2, conveyance time required to convey the sheet S from the cassette 5 (the sheet feeding position P1) to the registration position P2. At this time, with respect to each of the cassettes set as the targets, the control portion 10 calculates time required for a thick paper sheet S1 to reach the registration position P2 in a case where the thick paper sheet S1 is fed from the target cassette 5 into the conveyance path 4 (hereinafter the time will be referred to as "first time"). In the example shown in FIG. 3, the first time calculated through the time-calculation processing performed with respect to the cassette 5A is 2 sec (=200/100). The first time calculated through the time-calculation processing performed with respect to the cassette 5B is 6 sec (=600/100). The first time calculated through the time-calculation processing performed with respect to the cassette 5C is 10 sec (=1000/100). The first time calculated through the time-calculation processing performed with respect to the cassette 5D is 14 sec (=1400/100).

Further, with respect to each of the cassettes set as the targets, the control portion 10 calculates time required for a regular paper sheet S2 to reach the registration position P2 in a case where the regular paper sheet S2 is fed from the target cassette 5 into the conveyance path 4 (hereinafter the time will be referred to as "second time"). In the example shown in FIG. 3, the second time calculated through the time-calculation processing performed with respect to the cassette 5A is 1 sec (=200/200). The second time calculated through the time-calculation processing performed with respect to the cassette 5B is 3 sec (=600/200). The second time calculated through the time-calculation processing performed with respect to the cassette 5C is 5 sec (=1000/200). The second time calculated through the time-calculation processing performed with respect to the cassette 5D is 7 sec (=1400/200).

In step #4, the control portion 10 sets, as a first cassette, a cassette 5 with respect to which the first time is the shortest. Here, there can be a case where a cassette 5 in which thick paper sheets S1 are currently stored is set as the first cassette, or there can be a case where a cassette 5 in which regular paper sheets S2 are currently stored is set as the first cassette. In the example shown in FIG. 3, the first time with respect to the cassette 5A is the shortest. The first time with respect to the cassette 5A is 2 sec. Accordingly, the cassette 5A is set as the first cassette.

The control portion 10 sets, as a second cassette, a cassette 5 with respect to which the second time is the shortest, excluding the cassette 5 having been set as the first cassette. There can be a case where a cassette 5 in which thick paper sheets S1 are currently stored is set as the second cassette, or there can be a case where a cassette 5 in which regular paper sheets S2 are currently stored is set as the second cassette. In the example shown in FIG. 3, the second time with respect to the cassette 5B is the shortest, excluding the cassette 5A set as the first cassette. The second time with respect to the cassette 5B is 3 sec. Accordingly, the cassette 5B is set as the second cassette.

In step #5, the control portion 10 makes a judgment on whether or not a predetermined condition is satisfied. If, as a result, the control portion 10 has judged that the predetermined condition is not satisfied, the flow proceeds to step #6. If the control portion 10 has judged that the predetermined condition is not satisfied, the control portion 10 suspends the execution of the mixed-sheet job.

Here, if thick paper sheets S1 are set in the cassette 5 that has been set as the first cassette, the control portion 10 judges that the predetermined condition is satisfied. In other words, if thick paper sheets S1 are not set in the cassette 5 that has been set as the first cassette, the control portion 10 judges that the predetermined condition is not satisfied. In the example shown in FIG. 3, the cassette 5A is set as the first cassette. However, regular paper sheets S2 are set (thick paper sheets S1 are not set) in the cassette 5A. Accordingly, the control portion 10 judges that the predetermined condition is not satisfied.

The control portion 10 may be configured to judge that the predetermined condition is satisfied, only if thick paper sheets S1 are set in the cassette 5 that has been set as the first cassette and regular paper sheets S2 are set in the cassette 5 that has been set as the second cassette. In this configuration, for example, even when thick paper sheets S1 are set in the cassette 5A, if regular paper sheets S2 are not set in the cassette 5B (that is, for example, if thick paper sheets S1 are set also in the cassette 5B and regular paper sheets S2 are set only in the cassettes 5C and 5B), control portion 10 judges that the predetermined condition is not satisfied.

In step #6, the control portion 10 makes the operation panel 50 display a notification screen NS (see FIG. 6) on which there is arranged a message MS1 (corresponding to "recommendation information") recommending setting thick paper sheets S1 in the cassette 5 that has been set as the first cassette. If regular paper sheets S2 are not set in the cassette 5 that has been set as the second cassette, the control portion 10 includes, in the message MS1, a message recommending setting regular paper sheets S2 in the cassette 5 that has been set as the second cassette.

Figure 6:
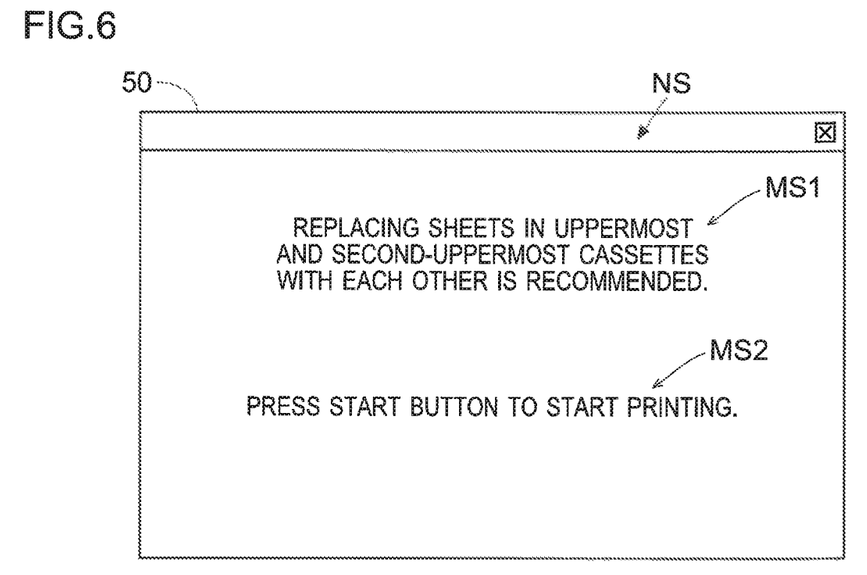
FIG. 6 is a diagram illustrating a notification screen displayed on an operation panel of the image forming apparatus according to the embodiment of the present disclosure.

For example, in the example shown in FIG. 3, the cassette 5A has been set as the first cassette, and the cassette 5B has been set as the second cassette. In this example, by replacing the regular paper sheets S2 set in the uppermost cassette 5A and the thick paper sheets S1 set in the second uppermost cassette 5B with each other, a state will be achieved in which thick paper sheets S1 are set in the uppermost cassette 5A (the first cassette) and regular paper sheets S2 are set in the second uppermost cassette 5B (the second cassette). For this purpose, in this example, the message MS1 as shown in FIG. 6 is displayed.

After the processing in step #6 is performed, the flow proceeds to step #7. In step #7, the control portion 10 judges whether or not the operation panel 50 has accepted a predetermined starting operation. In a case where the control portion 10 has judged that the starting operation has been performed on the operation panel 50, the flow proceeds to step #8. In a case where the control portion 10 has judged that the starting operation has not been performed on the operation panel 50, the flow proceeds to step #6.

For example, the operation panel 50 arranges, on the notification screen NS (see FIG. 6), a message MS2 meaning "Press the start button to start printing." Reading this message, the user presses the start button on the operation panel 50 after performing a sheet replacement operation according to the message MS1. There can be a case where the user presses the start button without performing the sheet replacement operation. Anyway, in a case where the notification screen NS has been displayed, the mixed-sheet job is not started unless the user operates the start button on the operation panel 50. The control portion 10 detects, as the starting operation, an operation performed with respect to the start button on the operation panel 50 while the notification screen NS is being displayed.

In step #8, the control portion 10 performs the sheet source setting processing. The control portion 10 selects, from among the cassettes 5 in which thick paper sheets S1 are set, a cassette 5 with respect to which the cassette-registration distance is the shortest, and sets the cassette 5 as the thick paper sheet source. The control portion 10 selects, from among the cassettes 5 in which regular paper sheets S2 are set, a cassette 5 with respect to which the cassette-registration distance is the shortest, and sets the cassette 5 as the regular paper sheet source.

In a case where the control portion 10 has judged, in step #5, that the predetermined condition is satisfied, processing of each of steps #6 and #7 is omitted, and the flow proceeds to step #8. In a case where, in step #1, the control portion 10 has judged that the number of copies to be printed in the mixed-sheet job is equal to or less than the threshold value, the processing of each of steps #2 to #7 is omitted, and the flow proceeds to step #8.

After the processing of step #8 is performed, the flow proceeds to step #9. In step #9, the control portion 10 makes the printing portion 40 start the mixed-sheet job. To print an image on a thick paper sheet S1, the printing portion 40 feeds the thick paper sheet S1 from the cassette 5 that has been set as the thick paper sheet source. To print an image on a regular paper sheet S2, the printing portion 40 feeds the regular paper sheet S2 from the cassette 5 that has been set as the regular paper sheet source.

The operation panel 50 previously accepts, from the user, an on/off setting of a support mode in which an optimum combination of sheet-S type and cassette 5 (a combination for improved productivity of the mixed-sheet job) is notified. The setting of the support mode is stored in the storage portion 20. Only in a case where the support mode has been turned on, the control portion 10 performs the processing according to the flowchart shown in FIG. 5. On the other hand, in a case where the support mode has been turned off, on accepting a request to execute a mixed-sheet job, the control portion 10 makes the printing portion 40 start the mixed-sheet job, without performing the processing according to the flowchart shown in FIG. 5.

With the configuration of the present embodiment, as discussed above, in a case where a print job to be executed by the printing portion 40 is a mixed-sheet job to be performed by using thick paper sheets S1 and regular paper sheets S2 having a smaller basic weight than thick paper sheets S1, before starting the mixed-sheet job, the control portion 10 makes the operation panel 50 display the message MS1 recommending setting thick paper sheets S1 in the cassette 5 set as the first cassette.

Thereby, in a case where thick paper sheets S1 are set in a cassette 5 disposed below a cassette 5 in which regular paper sheets S2 are set, the sheet replacement operation is performed by the user. As a result of the sheet replacement operation being performed, a state is achieved in which thick paper sheets S1 are set in the cassette 5 disposed above the cassette 5 in which regular paper sheets S2 are set. This helps suppress occurrence of delay in timing of a thick paper sheet S1 reaching the registration position P2.

Further, with the configuration of the present embodiment, as discussed above, the control portion 10 includes, in the message MS1, a message recommending setting regular paper sheets S2 in the cassette 5 set as the second cassette, before the mixed-sheet job is started. Thereby, for example, in a case of the state shown in FIG. 3, the regular paper sheets S2 set in the cassette 5A and the thick paper sheets S1 set in the cassette 5B are replaced with each other. That is, state transition is made from the state shown in FIG. 3 to the state shown in FIG. 4.

Here, the time required for a fed regular paper sheet S2 to reach the registration position P2 is shorter when the mixed-sheet job is executed in the state shown in FIG. 3 than when the mixed-sheet job is executed in the state shown in FIG. 4. It takes 1 sec in the state shown in FIG. 3, whereas it takes 3 sec in the state shown in FIG. 4. However, in the case of executing the mixed-sheet job in the state shown in FIG. 3, it takes 6 sec for a thick paper sheet S1 to reach the registration position P2, which is much longer than in the case of executing the mixed-sheet job in the state shown in FIG. 4. In the case of executing the mixed-sheet job in the state shown in FIG. 4, it takes 2 sec for a thick paper sheet S1 to reach the registration position P2. Thus, to minimize the increase of the required arrival time (the period of time from the start of feeding a sheet until the sheet reaches the registration position P2) for each of a thick paper sheet S1 and a regular paper sheet S2, it is preferable to execute the mixed-sheet job in the state shown in FIG. 4.

In the configuration of the present embodiment, as discussed above, in the case of making the operation panel 50 display the message MS1, the control portion 10 suspends the execution of the mixed-sheet job, and, after the operation panel 50 has accepted the predetermined starting operation, makes the printing portion 40 start the mixed-sheet job. Thereby, it is possible to suppress occurrence of inconvenience that the mixed-sheet job is started despite that the sheet replacement operation has not been performed.

In the present embodiment, as discussed above, when the operation panel 50 has accepted the starting operation, the control portion 10 makes the printing portion 40 start the mixed-sheet job regardless of in which cassettes 5 thick paper sheets S1 and regular paper sheets S2 are respectively set. This makes it possible to make the image forming apparatus 100 perform the mixed-sheet job without performing the sheet replacement operation, which is convenient to the user.

In the present embodiment, as discussed above, the control portion 10 recognizes the number of copies to be printed in the mixed-sheet job, and in a case where the number of copies exceeds the predetermined threshold value, the control portion 10 makes the operation panel 50 display the message MS1, and in a case where the number of copies is equal to or smaller than the threshold value, the control portion 10 makes the printing portion 40 start the mixed-sheet job without making the operation panel 50 display the message MS1. Here, in a case where the number of copies to be printed in the mixed-sheet job is small, since the number of times of switching of the printing target to a thick paper sheet S1 is also small, even if thick paper sheets S1 are set in a lower cassette 5, it does not have much effect on the productivity. Accordingly, it is preferable to display the message MS1 only in the case where the number of copies to be printed in the mixed-sheet job exceeds the threshold value so as to invite the user to perform the sheet replacement operation.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

What is claimed is:

1. An image forming apparatus comprising:
   a conveyance path passing through a registration position and a printing position;
   a plurality of setting portions for setting a sheet therein;
   a printing portion which
      feeds the sheet from any of the setting portions into the conveyance path to convey the sheet toward the registration position,
      once suspends conveyance of the sheet when the sheet reaches the registration position and then conveys the sheet toward the printing position, and
      executes a print job to print an image on the sheet when the sheet passes through the printing position,
   an operation panel which displays information and accepts an operation; and
   a control portion which controls the printing portion and the operation panel,
   wherein
   in conveying the sheet, the printing portion reduces a conveyance speed of the sheet as a basic weight of the sheet conveyed is greater, and
   in a case where the print job to be executed by the printing portion is a mixed-sheet job to be performed on a first sheet and a second sheet having a smaller basic weight than the first sheet, before starting the mixed-sheet job, with respect to each of such setting portions of the plurality of setting portions as have the first sheet or the second sheet set therein, the control portion
      calculates first time, which is a period of time required for the first sheet to reach the registration position in a case where the first sheet is fed from the each of the such setting portions,
      sets, as a first setting portion, a setting portion with respect to which the first time is shortest, and
      makes the operation panel display recommendation information recommending setting the first sheet in the setting portion set as the first setting portion.

2. The image forming apparatus according to claim 1, wherein
   before starting the mixed-sheet job, with respect to the each of the such setting portions of the plurality of setting portions as have the first sheet or the second sheet set therein, the control portion calculates second time, which is a period of time required for the second sheet to reach the registration position in a case where the second sheet is fed from the each of the such setting portions, and sets, as a second setting portion, a setting portion with respect to which the second time is shortest, excluding the setting portion set as the first setting portion, and includes, in the recommendation information, information recommending setting the second sheet in the setting portion having been set as the second setting portion.

3. The image forming apparatus according to claim 1, wherein in a case where the control portion makes the operation panel display the recommendation information, the control portion suspends execution of the mixed-sheet job, and makes the printing portion start the mixed-sheet job after the operation panel has accepted a predetermined starting operation.

4. The image forming apparatus according to claim 3, wherein in a case where the operation panel has accepted the starting operation, regardless of in which of the plurality of setting portions the first sheet and the second sheet are each set, the control portion makes the printing portion start the mixed-sheet job.

5. The image forming apparatus according to claim 1, wherein the control portion recognizes a number of copies to be printed in the mixed-sheet job, and when the number exceeds a predetermined threshold value, the control portion makes the operation panel display the recommendation information, and when the number is equal to or less than the threshold value, the control portion makes the printing portion start the mixed-sheet job without making the operation panel display the recommendation information.

* * * * *